(No Model.) 2 Sheets—Sheet 2.

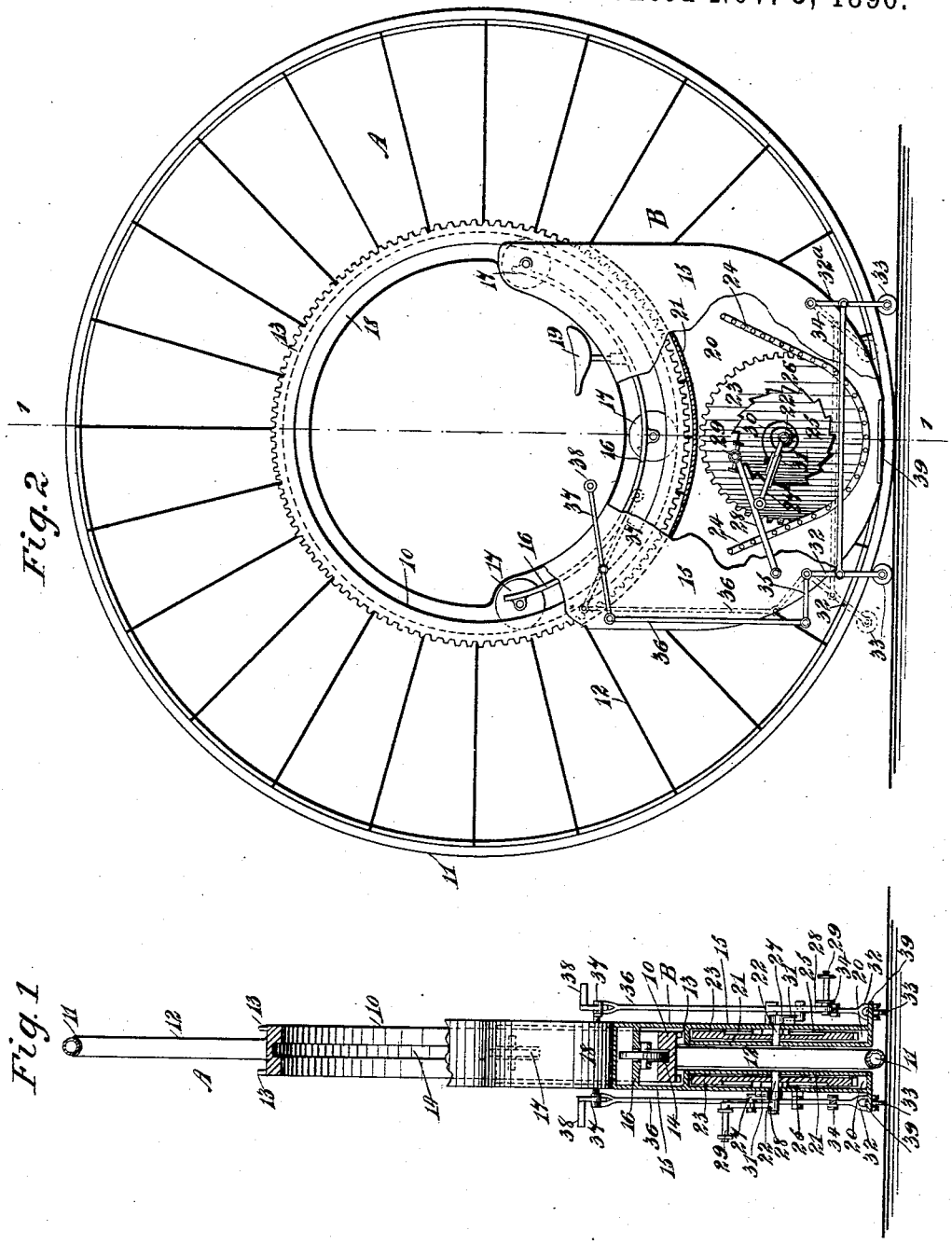

A. MILLER.
VELOCIPEDE.

No. 570,761. Patented Nov. 3, 1896.

WITNESSES:
J. B. Walker
J. Fedricker

INVENTOR
A. Miller.
BY Munn & Co.
ATTORNEYS.

UNITED STATES PATENT OFFICE.

AUGUST MILLER, OF LINDSBORG, KANSAS.

VELOCIPEDE.

SPECIFICATION forming part of Letters Patent No. 570,761, dated November 3, 1896.

Application filed November 9, 1895. Serial No. 568,478. (No model.)

*To all whom it may concern:*

Be it known that I, AUGUST MILLER, of Lindsborg, in the county of McPherson and State of Kansas, have invented a new and useful Improvement in Velocipedes, of which the following is a full, clear, and exact description.

My invention relates to an improvement in that class of velocipedes known as unicycles; and the object of the invention is to construct such a machine in a simple, durable, and economic manner and to provide a driving mechanism for the same which will consist of but few parts and may be readily manipulated, and, further, to so construct the unicycle that it may be used for traveling on land or on water.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
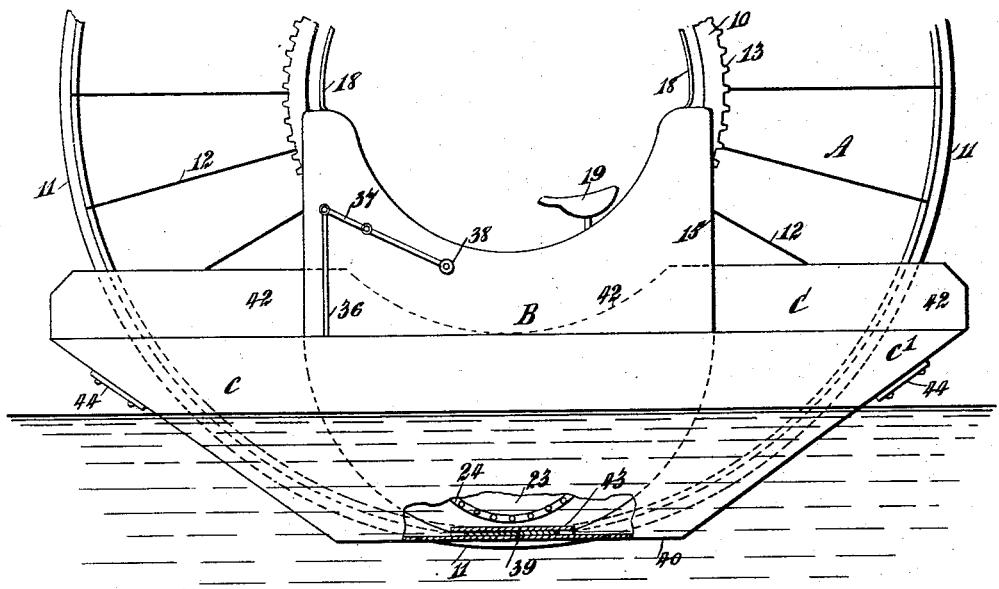
Figure 4:
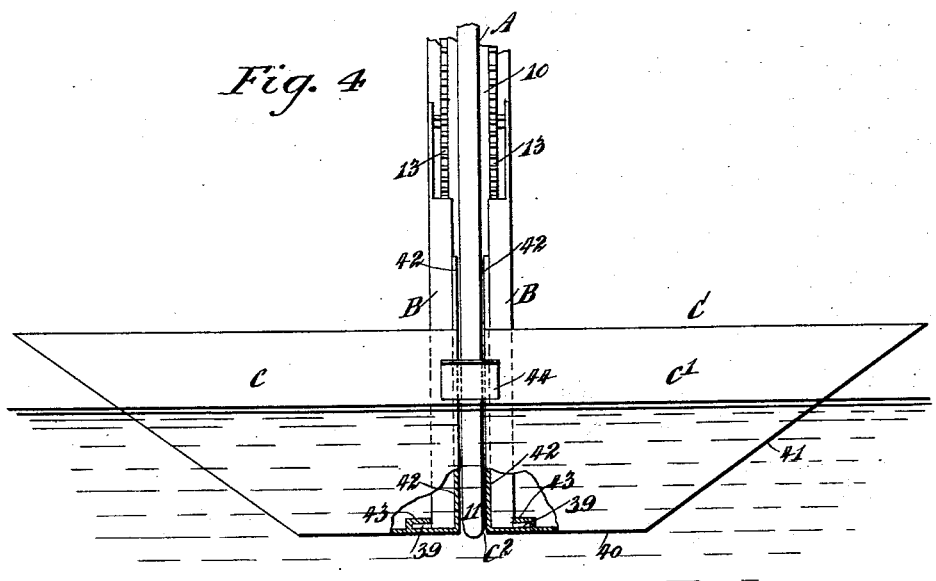

Figure 1 is a vertical section through the unicycle, taken substantially on the line 1 1 of Fig. 2. Fig. 2 is a side elevation of the improved unicycle, a portion of the frame carrying the driving mechanism being broken away. Fig. 3 is a partial side elevation of the unicycle adapted to travel upon the water, a portion of the frame of the driving mechanism and a portion of the pontoon connected with the wheel being broken away; and Fig. 4 is a partial edge view of the unicycle adapted for traveling upon the water, portions of the sections of the pontoon connected therewith being broken away.

In carrying out the invention the wheel A of the unicycle is constructed with a ring-hub 10, a tire 11, which may be and preferably is of a pneumatic character, and flat spokes 12, connecting the rim of the wheel with the hub, the spokes being made flat to enable the wheel to be used for traveling upon the water. The hub 10 of the wheel is made quite wide, and at each side of the wheel is provided with series of circularly-arranged teeth 13, forming, practically, a sprocket-gear at each side of the wheel, and the hub is further provided with an interior annular groove or channel 14, as shown best in Fig. 1, located at the central portion of the hub.

The wheel is adapted to carry or support a frame B, in which the driving mechanism is located and upon which the rider's seat is placed. This frame consists, ordinarily, of two outer plates 15, located one at each side of the wheel and extending to a point near the bottom of the wheel upward within the hub, the plates being concaved or rendered segmental where they enter the hub. The plates are connected by a partition 16, located near the top of the said plates, the upper face of the said partition being concaved and its curvature corresponding substantially to that of the hub. This partition extends through the hub, as shown in Fig. 1, and carries any desired number of friction-wheels 17, said wheels being made to travel in the groove or channel 14 of the hub, as shown in both Figs. 1 and 2, and a substantially circular guard or shield 18 is secured to the upper edges of the side plates 15 of the frame, the shield or guard being likewise contained within the hub, and is adapted to protect the rider from contact with the inner wall of the hub or from any oil or other lubricant carried by that portion of the wheel, and the rider's seat 19 is preferably placed upon the partition 16 of the aforesaid frame, nearer the back of the frame than the front, as shown in Fig. 2.

A compartment or chamber 20 is formed at the back of each of the plates 15 of the frame B by constructing on the inner faces of the said plates a boxing 21, as is best shown in Fig. 1, and this boxing extends from the lower portion of each plate upward to a point just below the hub of the traction-wheel A. In each side portion of the frame B, preferably near a central point therein, what may be termed a "pedal-shaft" 22 is journaled, and on each of the pedal-shafts a gear 23 is loosely mounted, each gear being connected with a row of teeth or sprocket-surface 13 on the hub of the traction-wheel, the connection being made by means of belts 24, preferably link belts. Each gear 23 is also preferably provided with a circular depression 25 in its outer face, and the peripheral wall of each depression is provided with a series of ratchet-teeth 26.

A crank-arm 27 is secured to the outer end of each pedal-shaft 22, and each crank-arm is pivotally connected to about the central portion of a pedal-lever 28, and these levers are fulcrumed at their forward ends upon the side pieces of the frame B, being provided with pedals 29 of any approved construction at their outer ends and within convenient reach of the rider when seated on the saddle 19.

A spring 30 is coiled around each pedal-shaft where it passes through the depressed surface 25 of its gear 23, the spring being secured at one end to the said shaft and at its opposite end to a dog 31, which dog is mounted to slide on the crank-arm 27 belonging to that shaft. Thus it will be observed that in propelling the machine the rider will work the pedals 29 with an up-and-down movement, the down movement of each pedal-lever forcing the dog in communication with that lever downward, revolving the wheel 23, with which it engages, and when the limit of the downward stroke of the pedal-lever is reached the spring 30 will act to carry the said lever up to its upper position, the dog slipping over the ratchet-teeth 26, it being understood that the crank-arms 27 of the pedal-shaft are so placed relative to one another that when one of them is in the upper position the other will be in the lower position, as shown in Fig. 1.

It is necessary that the unicycle should be steadied when the rider is mounting or dismounting and that a brake should be provided to retard the movement of the traction-wheel when desired. Both of these objects are accomplished by placing at each side of the wheel, at front and rear of its center, wheels 33, as best shown in Fig. 2. Each forward wheel is carried by an arm 32, pivoted at the upper end to the outside of the frame B, and each rear wheel is carried by a corresponding arm $32^a$, pivoted at its upper end to the outside of the frame near the rear, and these two pivoted arms at each side of the machine are pivotally connected by a bar 34. A link 35 is pivotally connected with the upper end of each of the forward arms 32, and each link 35 is connected with an upwardly-extending longer link 36, while each long link 36 is pivotally attached at its upper end to a hand-lever 37, fulcrumed at or near its center upon the upper forward portion of the outer side face of the said frame B. The hand-levers extend within the ring-hub, each terminating in a handle 38 within convenient reach of the rider's seat 19. When the hand-levers are carried upward at their rear ends, as shown in Fig. 2, the small wheels 33 will engage with the ground at each side of the main wheel and will serve to hold the said wheel in an upright position, and when the main wheel is in motion said smaller wheels will serve as a brake therefor.

After the rider is mounted the hand-levers are forced downward to the position shown in dotted lines in Fig. 2, thereby raising the smaller wheels 33 out of engagement with the ground. As the frame B, carrying the rider and driving mechanism, has a roller bearing on the main or traction wheel, the latter will revolve with the least possible amount of friction. A horizontal lip 39 is formed at the lower end of each side of the main frame B, the said lip being brought into action when the unicycle is to be used to travel upon the surface of water, as illustrated in Figs. 3 and 4.

In order to adapt the unicycle for marine use, a pontoon C is connected with the unicycle in such manner as not to interfere with the movement of the main wheel A, which in this event will act as a paddle-wheel. The pontoon has a dished structure, being preferably in its entirety of a circular shape, except that it is provided with a flat bottom 40, and its sides 41 have a decided upward inclination. The pontoon is made in two sections $c$ and $c'$, and the sections are brought together in direction of the front and rear of the wheel, each section being provided with an upwardly-extending partition 42, which partition virtually forms the inner wall of the section to which it belongs, and the two sections are spaced a suitable distance apart, forming a channel $c^2$, and the sections of the pontoon may be held in their spaced position by any suitable means, as, for example, straps 44 may be employed to connect them near their upper edges. Each pontoon-section is provided upon the inner face of its flat bottom 40 with a keeper 43, open at each end, in order that when the main wheel has been placed in the channel $c^2$ between the pontoon-sections the lips 39 on the frame B of the unicycle may be slid beneath the keepers 43, as shown in Figs. 3 and 4, thus securely holding the pontoon to the frame of the unicycle and leaving the wheel free to revolve.

When the unicycle is provided with the pontoon just described or the equivalent thereof, the said pontoon will preserve the equilibrium of the wheel on the water, and the wheel when revolved by the driving mechanism heretofore described will serve to propel the entire machine in a forwardly or rearwardly direction, as may be desired, and with great speed.

It will be understood that in placing the unicycle in the pontoon the partitions 42 of the pontoon-sections will extend upward at the back of the side pieces of the frame B, as shown particularly in Fig. 4. The main or driving wheel A may be made to extend as far as found desirable below the bottom line of the pontoon.

Having thus described my invention, I claim as new and desire to secure by Letters Patent—

1. In a unicycle, the combination, with a traction-wheel, the said wheel being provided with a ring-hub and a toothed surface on the hub, of a frame having rolling connection with the hub of the wheel, being supported thereby, pedal-shafts journaled in the said frame, gears mounted on the said pedal-shafts, having belt connection with the teeth on the hub of the traction-wheel, ratchets connected with the said gears, crank-arms attached to the said pedal-shafts, dogs engaging with the ratchets, being moved by the crank-arms in one direction and spring-controlled in the opposite direction, and levers pivoted on the frame, each lever being provided with a pedal and having pivotal connection with an arm of the pedal-shaft, as and for the purpose set forth.

2. In a unicycle, the combination, with the traction-wheel and a frame supported thereby, of arms pivoted to the front and rear of said frame at each side of the traction-wheel, being of sufficient length to extend downward below the tire of the wheel, each arm being provided at its lower end with a small wheel, and a connecting-bar uniting the two arms, a hand-lever fulcrumed upon the forward portion of the frame, one end whereof extends within the hub-section of the traction-wheel, and links pivotally connected at angles to each other, one of the links being pivotally attached to the hand-lever and the other to one of the wheel-carrying arms, as and for the purpose set forth.

3. In a unicycle, the combination, with the traction-wheel thereof, having paddle-like spokes, of a pontoon provided with a central channel to receive the said traction-wheel, and a locking connection between the pontoon at each side of its channel and a portion of the frame of the unicycle in which the traction-wheel revolves, said connection consisting of lips extended from the frame and keepers on the pontoon-sections to engage therewith, as and for the purpose set forth.

4. In a unicycle, the combination, with the traction-wheel thereof, and a frame supported by the said wheel, being adapted to contain the driving mechanism of the same, the frame being provided with lips extending outwardly therefrom, of a pontoon constructed in two water-tight sections, the inner wall of each section being adapted for engagement with a portion of the said frame of the unicycle, the wheel entering the space between the two pontoon-sections, keepers located upon the pontoon-sections, adapted to receive the lips of the unicycle-frame, and means, substantially as described, for connecting the pontoon-sections, as and for the purpose set forth.

AUGUST MILLER.

Witnesses:
AUG. NORDWALL,
GUST. E. NISTRAND.